United States Patent [19]
Van Andel et al.

[11] Patent Number: 5,013,060
[45] Date of Patent: May 7, 1991

[54] APPARATUS FOR PROTECTING A TRUCK BED AND SIDE RAILS

[76] Inventors: Chris M. Van Andel, 1508 W. Grover St.; Larry M. Van Andel, 9898 Van Buren, both of, Lynden, Wash. 98264

[21] Appl. No.: 406,789

[22] Filed: Sep. 13, 1989

[51] Int. Cl.⁵ .............................................. B60D 1/28
[52] U.S. Cl. ................................ 280/477; 280/423.1; 280/433; 296/39.2
[58] Field of Search ................. 280/477, 491.1, 491.5, 280/495, 500, 507, 415.1, 418.1, 406.2, 433, 434, 441.2, 425.1, 425.2, 423.1, 762, 770; 296/39.2

[56] References Cited

U.S. PATENT DOCUMENTS

| | | | |
|---|---|---|---|
| 2,411,404 | 11/1946 | Winn | 280/435 |
| 3,325,186 | 6/1967 | Lund | 280/477 |
| 3,801,138 | 4/1974 | Quick | 280/422 |
| 3,811,706 | 5/1974 | Tucker et al. | 280/477 |
| 3,826,516 | 7/1974 | Weber | 280/407 |
| 3,837,675 | 9/1974 | Barnes et al. | 280/433 |
| 4,143,885 | 3/1979 | Mahosky | 280/477 |
| 4,176,853 | 12/1979 | Brock | 280/509 |
| 4,183,548 | 1/1980 | Schneckloth | 280/433 |
| 4,227,713 | 10/1980 | Blodgett et al. | 280/434 |
| 4,540,194 | 9/1985 | Dane | 280/491.3 |
| 4,643,443 | 2/1987 | Husa | 280/491.1 |
| 4,826,199 | 5/1989 | Chambers | 280/434 |
| 4,890,874 | 1/1990 | Davis | 296/39.2 |

FOREIGN PATENT DOCUMENTS 8702644 6/1989 Netherlands ..................... 280/433

Primary Examiner—Charles A. Marmor
Assistant Examiner—A. M. Boehler
Attorney, Agent, or Firm—Hughes & Multer

[57] ABSTRACT

A bed saver device for protecting the bed and side rails of a truck or other towing vehicle against damage in the event that a towed vehicle-associated component of a fifth-wheel-type hitch comes free from the truck bed-mounted part of the hitch. The bed protecting device is mounted behind and immediately adjacent the truck-associated part of the hitch and includes a rectilinear plate, supported above the floor of the truck bed, which breaks the fall of the towed vehicle-associated component. Members incorporated in the bed saver and surrounding the restraining plate keep the towed vehicle-mounted component from sliding off the plate in event that the towed vehicle-associated hitch component comes loose from and drops onto the restraining plate.

12 Claims, 7 Drawing Sheets

APPARATUS FOR PROTECTING A TRUCK BED AND SIDE RAILS

TECHNICAL FIELD OF THE INVENTION

The present invention relates to a novel device which is designed to protect a truck bed and side rails from damage in the event that a towed vehicle-associated component of a fifth-wheel-type hitch comes loose from that part of the hitch mounted in the bed of the truck.

BACKGROUND OF THE INVENTION

In recent years the towing of trailers using so-called fifth-wheel hitches mounted in the backs of pick-up trucks has gained in popularity. The king pin or towed vehicle-associated component, mounted on the under side of, and at the front end of the trailer, is secured to a fifth-wheel hitch component mounted in the back of the pick-up truck The fifth-wheel hitch component is preferably mounted over the rear axle of the pick-up truck for increased strength and stability.

A problem that is not currently addressed can arise if the trailer's king pin, which fits into the fifth-wheel hitch, pulls free from the hitch either because of human error or because of hitch failure. When this occurs, the king pin plunges toward the bed of the pick-up truck and the trailer descends with force onto the bed or side rails of the pick-up truck with considerable consequent damage to the bed or side rails and possible damage to the under side of the trailer's front end as is shown in FIG. 1.

Although various fifth-wheel hitch devices exist, none specifically addresses the potential for damage that separation of the king pin from the truck-associated part of a fifth-wheel hitch may cause.

Thus, Weber, U.S. Pat. No. 3,826,516, discloses a fifth-wheel mounting structure; but no method for dealing with the problem herein addressed is provided. Similarly, Dane, U.S. Pat. No. 4,540,194, provides a mounting structure that folds down under a plate in a pick-up truck bed; but the problem herein addressed is not dealt with.

SUMMARY OF THE INVENTION

I have now invented and disclosed herein a novel fifth-wheel bed saver that addresses and remedies the problem described above. More specifically, this invention provides a restraining structure that breaks the fall of the king pin and captures the king pin if it becomes separated from the truck-associated part of the hitch, thus preventing damage to the bed and side rails of the pick-up truck and the under side of the trailer.

Because developments in this area have focused on placement of the hitch in the bed of the pick-up truck to maximize the strength and stability of the connection, the problem of preventing potential damage to the pick-up truck, in case the trailer comes loose due to hitch failure or human error, has not been addressed.

My novel fifth-wheel bed saver prevents damage to the pick-up truck and the trailer in case of hitch failure or human error. In addition, any persons or possessions in the trailer would be spared from the fall which would occur without the presence of the fifth-wheel bed saver.

Aside from the foregoing, my novel device is simple, durable, effective, easy to install, and relatively inexpensive to manufacture.

OBJECTS, FEATURES, AND ADVANTAGES OF THE INVENTION

From the foregoing, it will be apparent to the reader that one important and primary object of my invention is to prevent damage to the bed or side rails of a pick-up truck used for towing a fifth-wheel trailer in case of hitch failure or human error causing the trailer to come free from the pick-up truck.

Other important objects and features and additional advantages of my invention will become apparent to the reader from the foregoing and the appended claims and as the ensuing detailed description and discussion proceeds in conjunction with the accompanying drawing.

DETAILED DESCRIPTION OF THE INVENTION

Figure 1:
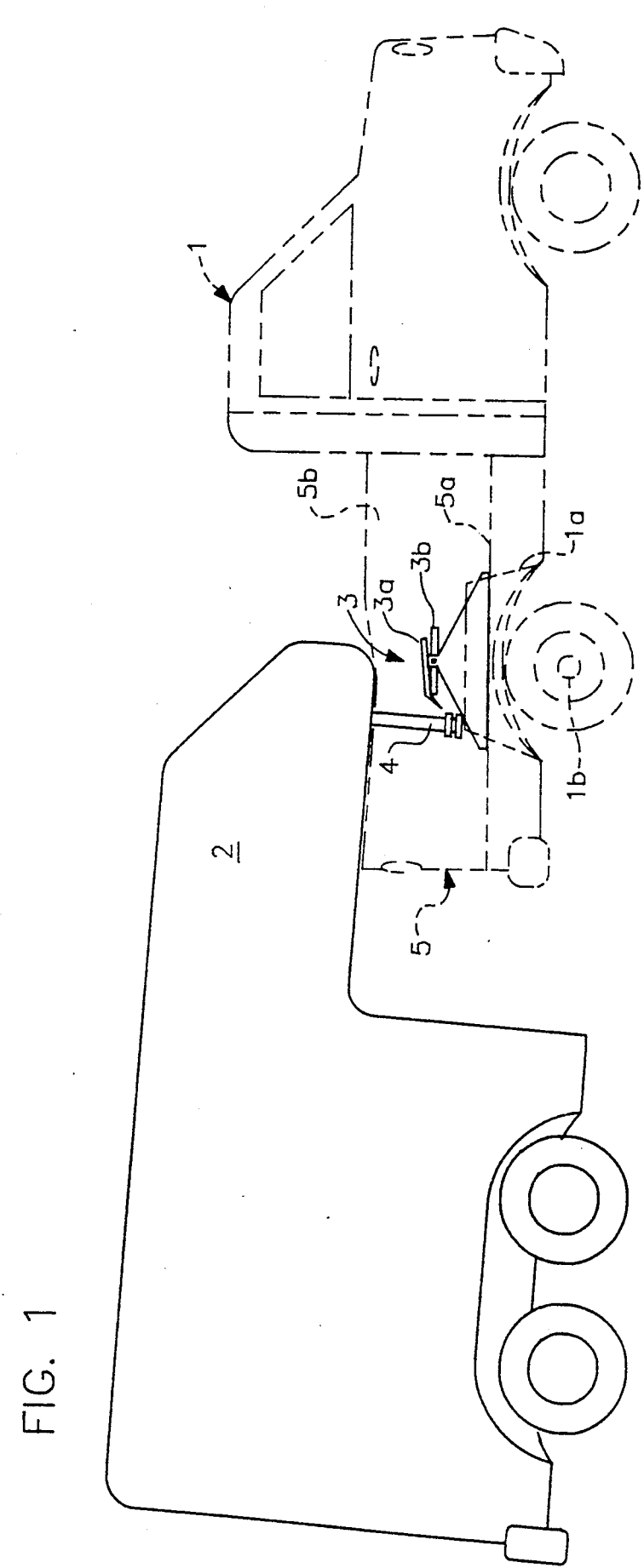
FIG. 1 is a pictorial view of a truck and a towed vehicle coupled to the truck with a fifth-wheel-type hitch which has become uncoupled, allowing the front end of the trailer to drop down, impact upon, and damage, the bed of the truck.
Figure 2:
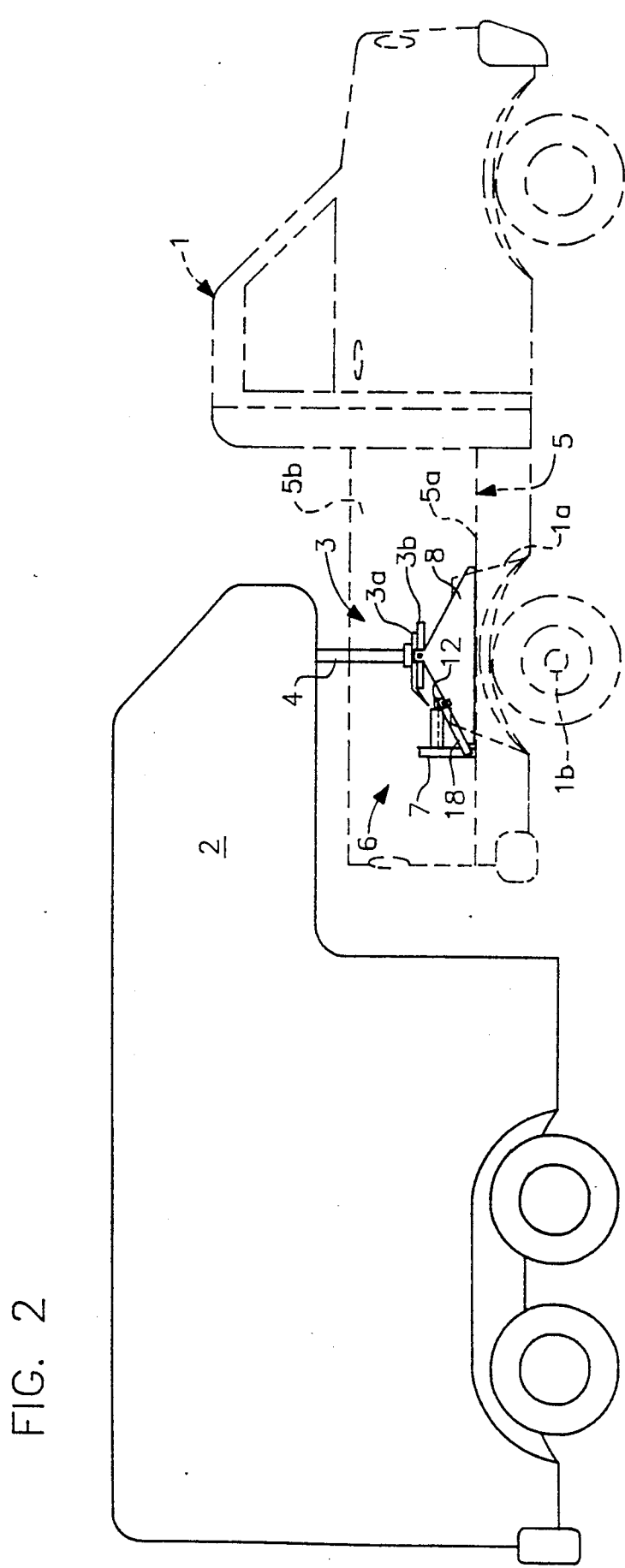
FIG. 2 is a pictorial view of a truck, a towed vehicle coupled to the truck with a fifth-wheel-type hitch, and a fifth-wheel bed saver which is constructed in accord with the principles of the present invention and is mounted in the bed of the truck immediately behind the truck-mounted part of the hitch to keep the towed vehicle from striking and damaging the bed or side rails of the truck in the event that the towed vehicle-associated part of the hitch comes free from the truck-mounted part of the hitch.

Referring now to the drawing, FIG. 2 depicts a pick-up type towing vehicle 1 and a towed vehicle or trailer 2 coupled to the pick-up by a fifth wheel-type hitch 3 A trailer-associated component or king pin 4 of the fifth-wheel hitch 3 is securely fastened to a tilting hitch component 3a mounted in the bed 5 of the towing vehicle 1, and a fifth-wheel-hitch truck bed saver embodying the principles of the present invention is mounted in the bed 5 of the towing vehicle to the immediate rear of the fifth wheel hitch.

Figure 8:
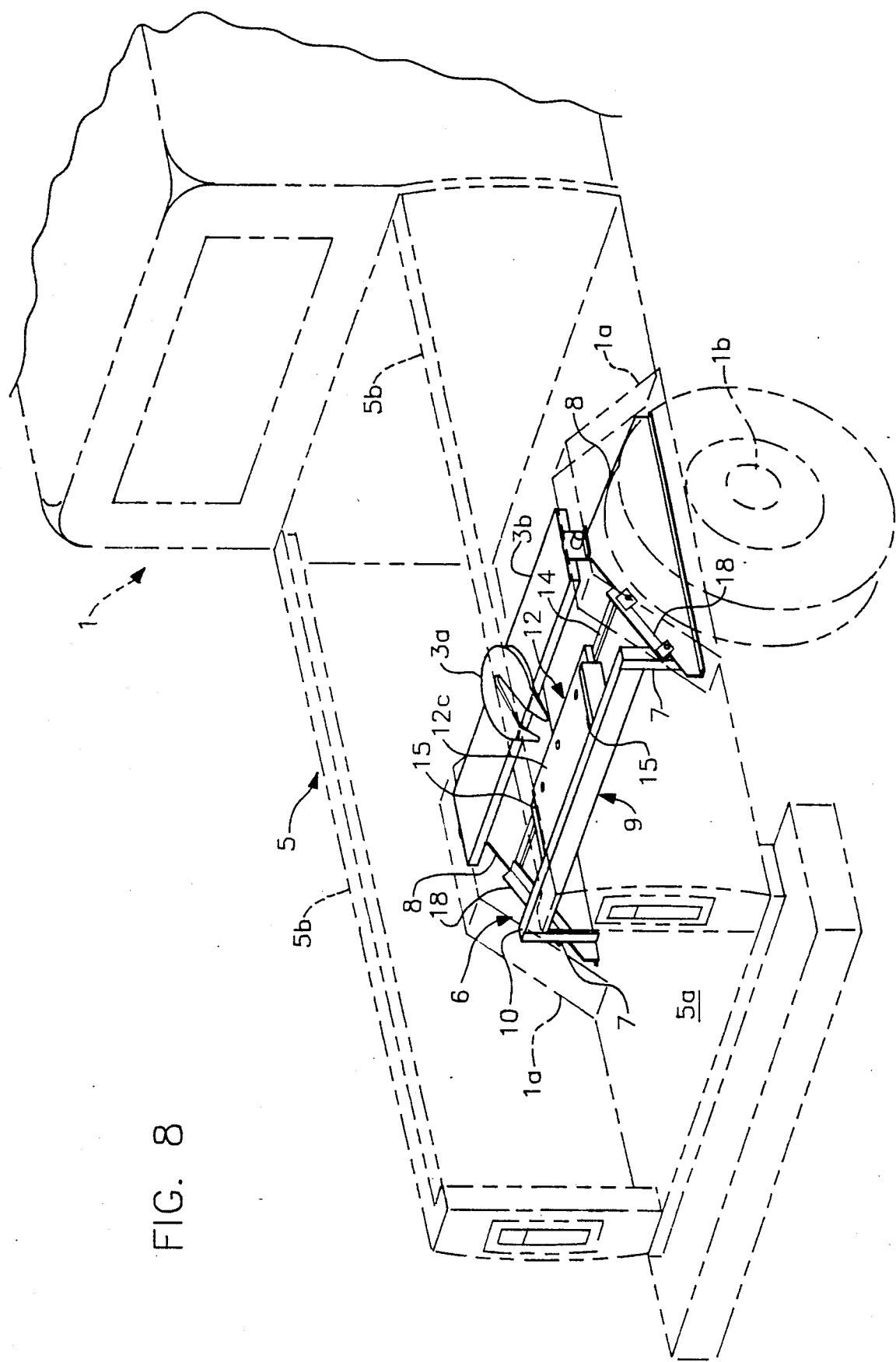
FIG. 8 is a perspective view of a pick-up truck with a fifth-wheel hitch and the bed saver fitted on the flanges of the fifth-wheel hitch.

Major components of the fifth-wheel bed saver 66 are shown in FIGS. 4, 5, 6A, 6B, 7 and 8. They include two like vertical supports 7 spaced to fit snugly within the left and right brackets 8 or other hitch-component supporting members of various models of fifth-wheel hitches. As is shown in FIG. 8, these brackets and the hitch components 3a and 3b they support will typically be located between or over the wheel wells 1a of towing vehicle 1 and over the rear axle 1b of the vehicle at a level below side rails 1c.

A horizontally oriented, transversely extending, elongated channel 9 is attached at its opposite ends to the two vertical supports 7. This bar has an upper lip 10 and a lower lip 11.

The rear edge of a rectilinear, horizontally oriented, transversely extending, king pin capture and restraining plate 12 backed by flooring 12d or other material is seated on and attached by bolts (not shown) through holes 13a (see FIG. 5) to the lower lip 11 of the transversely extending channel.

Figure 3:
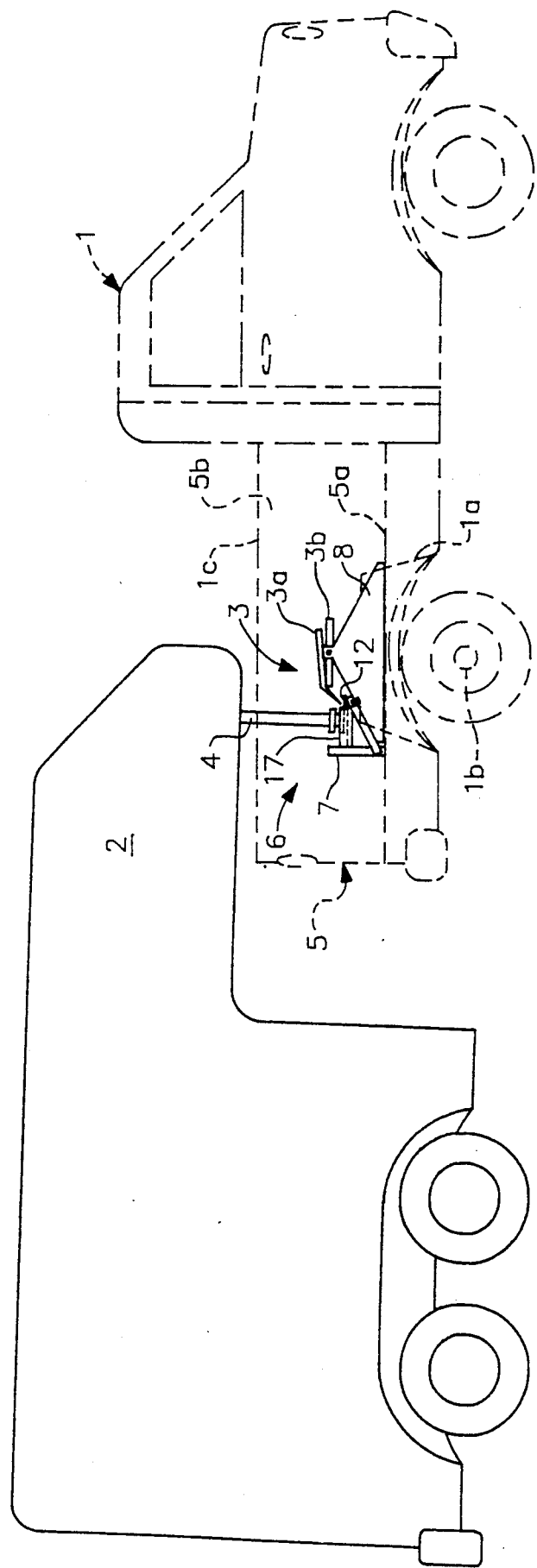
FIG. 3 shows pictorially a truck and a towed vehicle whose towed vehicle-associated part of a fifth-wheel hitch has come free of the truck-mounted part of the hitch and been captured and restrained by the bed saver to keep the trailer and/or trailer-associated part of the hitch from striking and damaging the bed or side rails of the truck.
Figure 4:
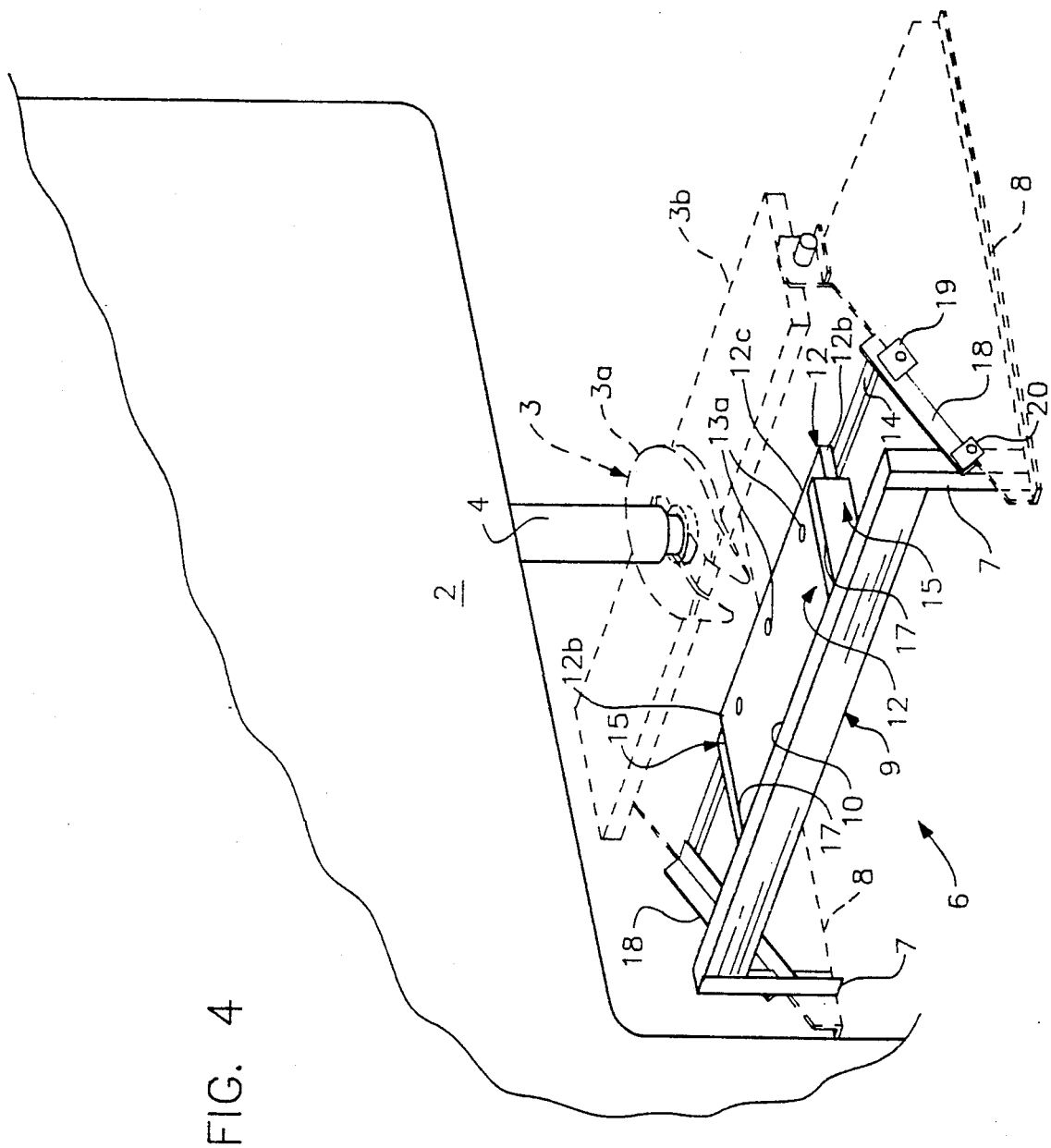
FIG. 4 shows, pictorially, the towed vehicle associated part of the hitch securely in place in the truck-mounted part of the hitch.
Figure 5:
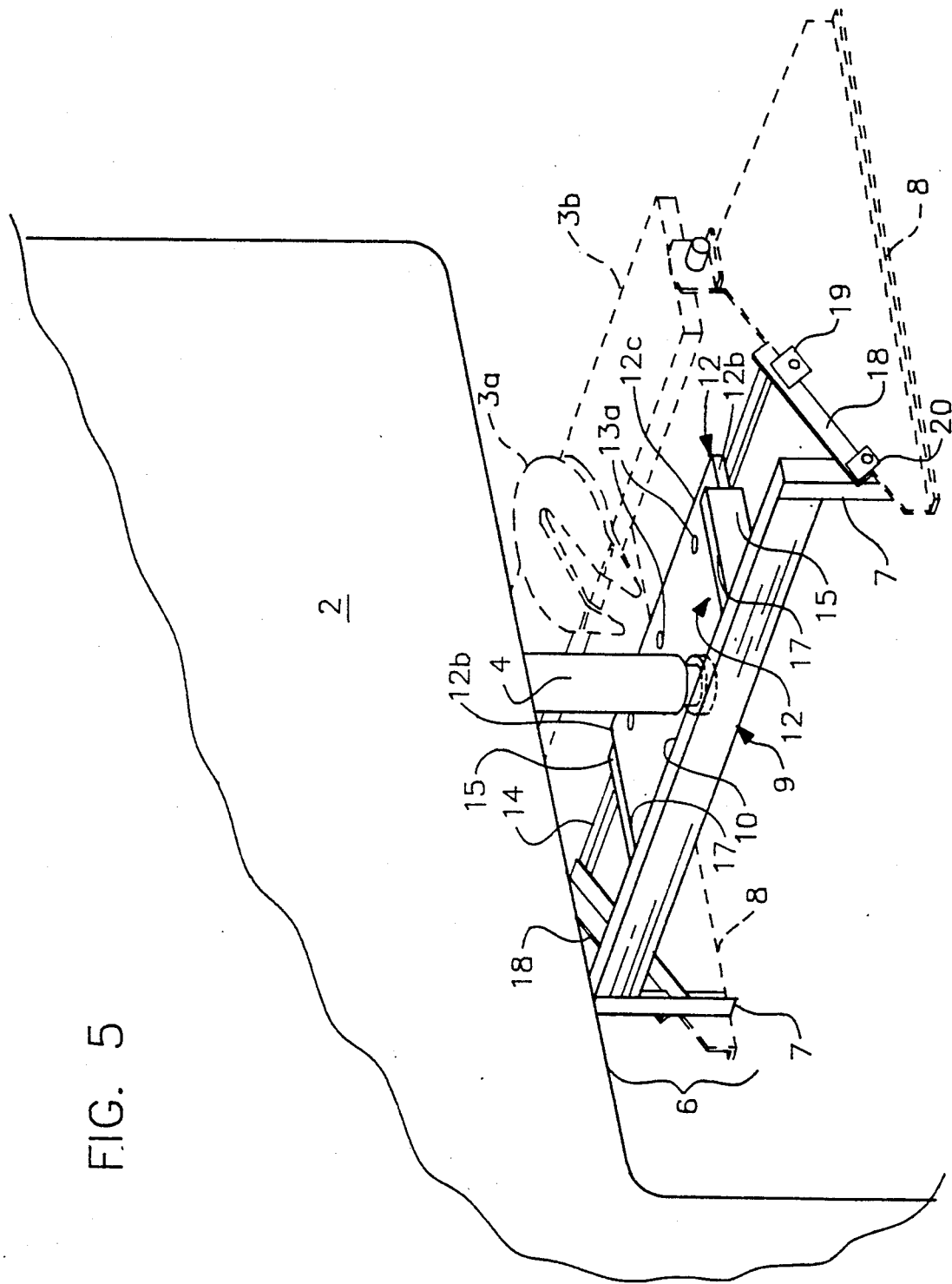
FIG. 5 is a view similar to FIG. 4, but with the towed vehicle-associated part of the hitch having come free from the truck-mounted part of the hitch and having been captured and restrained by the fifth-wheel bed saver.
Figure 6A:
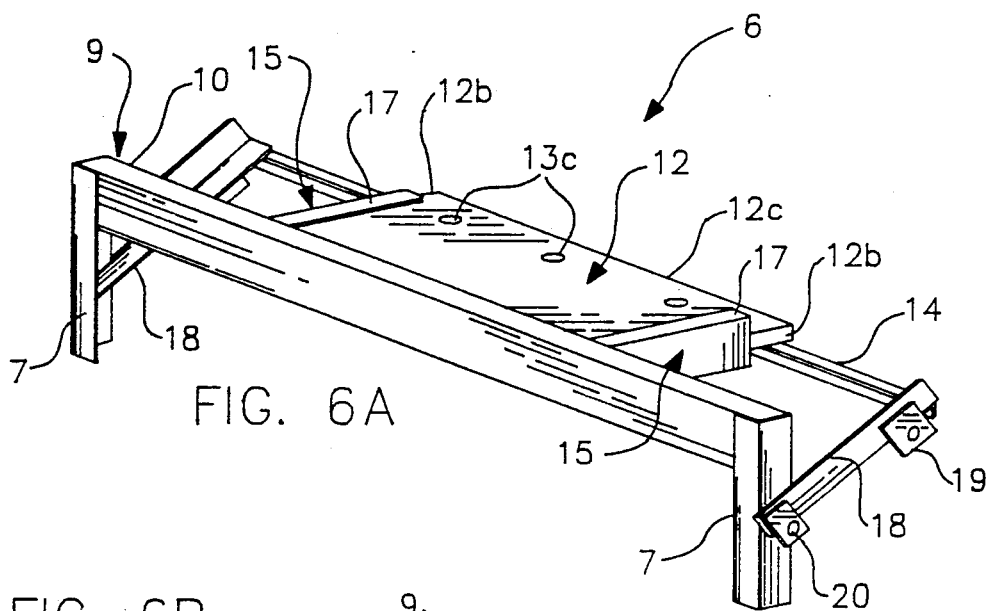
FIGS. 6A and 6B are pictorial views, respectively looking to the front and rear of the bed saver, and showing a rectilinear restraining plate component of the bed saver, the restraining plate having edges on three sides thereof to capture and restrain a towed vehicle-associated part of a fifth-wheel hitch that has come free.
Figure 6B:
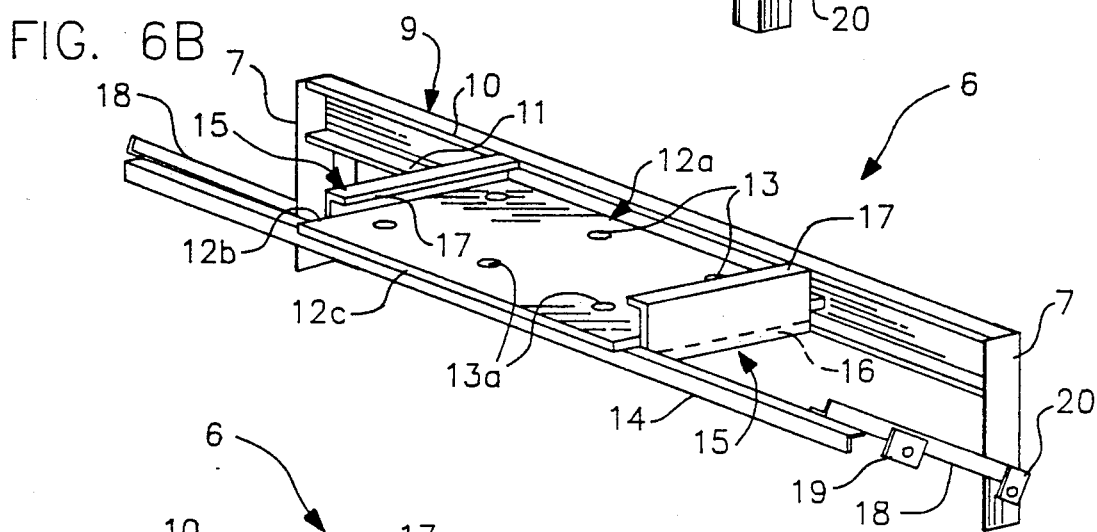
Figure 7:
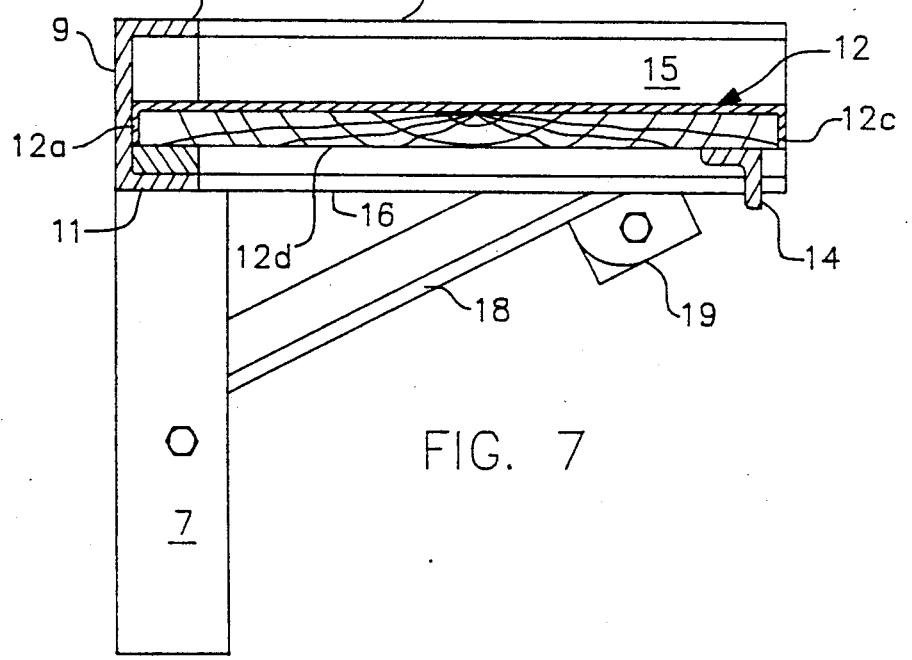
FIG. 7 is a cross-section through the bed saver.

An elongated bar 14 runs parallel to channel or bar 9 in a plane substantially level with the first elongated bar 9 and below plate 12 at its front edge 12c. The first elongated bar 9 and second elongated bar 14 support the rectilinear restraining plate 12 at a level which is high enough above the floor 5a of truck bed 5 that trailer 2 will not strike and damage the side rails 5b (or other parts) of the truck bed as shown in FIGS. 3 and 5 if king pin 4 comes free from truck-associated hitch component 3a. Bolts (not shown) through a second set of holes 13a in plate 12 fix the latter to bar 14.

Two shorter bars or channels 15 are also includes in bed saver 6 Each bar 15 has a short lower lip 16 and a short upper lip 17. Each lower lip 16 is attached to one of the shorter sides of the rectilinear restraining plate 12. Plate 12 is seated on these lower lips or flanges of channels 15 at the opposite ends 12b of the plate.

The two shorter bars 15 and the first elongated bar 9 serve to keep a trailer-associated hitch component or king pin 4 on plate 12 when, as shown in FIG. 5, it has come free from the truck mounted, fifth wheel hitch component 3a. This is because the king pin cannot slide off the rear edge 12a or the ends 12b of plate 12. The pivotably mounted support 3a of hitch 3 keeps a king pin 4 intercepted by plate 12 from sliding forward and off the front edge 12c of that plate. As discussed above, this just-described king pin capturing arrangement keeps trailer 2 from dropping down far enough to strike and damage the side rails 5b (or other parts) of truck bed 5 (see FIG. 5).

It was pointed out above that transversely extending channel 9 and angle iron 14 support king pin capturing and restraining plate 12 above the floor 5a of truck bed 5 Angle iron 14 is in turn supported from the laterally spaced apart hitch brackets 8 by longitudinally extending arms 18, typically fabricated from angle iron These components run along the hitch supporting components 8 A small metal plate or keeper 19 is pivotally attached by a method such as welding to that end of each arm 18 nearer the second elongated bar 14. Each keeper 19 is then pivotally secured to the associated hitch supporting flange 8 by a nut and bolt to support the longitudinal bars 15, the transversely extending bar 14, and the rear edge 12a of restraining plate 12 at the proper level above the floor 5a of truck bed 5.

A second small metal plate or bracket 20 is also attached by a method such as welding to that end of each arm 18 nearer the first, elongated, restraining plate supporting channel 9. These brackets are pivotally secured to the two vertical supports 7, also at the front edge 12c of plate 12, by a nut and bolt. As is apparent from FIG. 4, for example, the connecting of bars 9 and 14 at their opposite ends to hitch supports 8 and to bed saver supports 7 also positively positions bed saver 6 in an optimum position directly to the rear of fifth-wheel hitch components 3a and 3b.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description; and all changes which come within the meaning and range of equivalency of the claims are therefore intended to be embraced therein.

What I claim as my invention is:

1. A device for restraining and capturing a trailer-associated component of a fifth-wheel-type hitch in the event that said trailer-associated component comes free of that part of said fifth-wheel hitch which is mounted in a bed of a towing vehicle, said device comprising: a component which has a front edge and a rear edge and first and second laterally spaced ends is adapted to extend transversely and in a generally horizontal orientation across and elevated above the towing vehicle bed with its end facing opposite sides of the bed and means at the ends and rear edge of said horizontally oriented component for trapping the trailer-associated hitch component as its falls onto said capturing and restraining device component on that component.

2. A device for restraining and capturing a trailer-associated component of a fifth-wheel -type hitch in the event that said trailer-associated component comes free of that part of said fifth-wheel hitch which is mounted in a bed of a towing vehicle, said device comprising:
   a. a component which has a front edge and a rear edge and first and second laterally spaced ends and is adapted to extend transversely and in a generally horizontal orientation across the towing vehicle bed with its ends facing opposite sides of the bed;
   b. means at the ends and rear edge of said horizontally oriented component for trapping the trailer-associated hitch component as it falls onto said capturing and restraining device component on that component;
   c. vertical supports at first and second laterally spaced sides of the bed;
   d. the hitch-trapping means of said device comprising an elongated member with ends fixed to said vertical supports;
   e. said hitch capturing and restraining device also including means for vertically trapping a trailer-associated hitch component which has come free on the horizontally oriented component of the hitch capturing and restraining device, said trapping means being an upper lip on said elongated member; and
   f. said elongated member having a lower lip on which the rear edge of the horizontally oriented component of said hitch capturing and restraining device is seated.

3. A device as defined in claim 1 which has: a second, elongated, horizontally oriented, transversely extending member supporting the front edge of the horizontally oriented component and means for fixing said second elongated member to said vertical supports in parallel relationship to said first elongated member.

4. A device for restraining and capturing a trailer-associated component of a fifth-wheel type hitch in the event that said trailer-associated component comes free of that part of said fifth-wheel hitch which is mounted in a bed of a towing vehicle, said device comprising:
   a. a component which has a front edge and a rear edge and first and second laterally spaced ends and is adapted to extend transversely and in a generally horizontal orientation across the towing vehicle bed with its ends facing opposite sides of the bed;
   b. means at the ends and rear edge of said horizontally oriented component for trapping the trailer-associated hitch component falling onto said capturing and restraining device component on that component;
   c. hitch component vertically trapping members at the ends of said horizontally oriented, hitch restraining and capturing device component;
   d. the hitch trapping member at the ends of said horizontally oriented component being integral, horizontal, upper lips on said hitch component trapping members; and
   e. said hitch component trapping means each having a horizontally oriented, integral, lower lip on which the horizontally oriented component of said hitch restraining and capturing device is seated.

5. The combination of a towing vehicle having a bed with first and second, laterally spaced apart sides and a front and rear ends, a towing vehicle, a fifth-wheel-type hitch for coupling said towed vehicle to said towing vehicle, and a device for restraining and capturing a towed vehicle-associated component of said fifth-wheel-type hitch in the event that said towed vehicle-associated hitch component comes free of a component of said hitch associated with the towing vehicle;
   a. said hitch also having:
      (i) brackets of the first and second sides of the towing vehicle bed,
      (ii) said towing vehicle associated hitch component being supported from said brackets and being engageable by said towed vehicle-associated hitch component; and
   b. said hitch restraining and capturing device comprising:
      (i) two transversely spaced apart, vertical supports,
      (ii) hitch component capturing and restraining means with a front edge proximate to the bracket-supported hitch component and a rear edge spaced toward the rear end of the towing vehicle bed from said front edge, said rear edge being supported between and from said vertical supports, and
      (iii) means for mounting the vertical supports and the restraining means in the bed of the towing vehicle and adjacent the towing vehicle-associated component of said hitch so that the towed vehicle-associated component of said hitch will be intercepted and held above the bed by said restraining means if it comes free of the towing vehicle-associated component of the hitch.

6. A combination as defined in claim 5 which has means for securing the vertical supports of the hitch capturing and restraining device relative to the brackets of the fifth-wheel-type hitch so as to position the hitch capturing and restraining means of the device in hitch component-intercepting relationship of the towing vehicle-associated components of the fifth-wheel hitch.

7. The combination of a towing vehicle having a bed with first and second, laterally spaced apart sides and front and rear ends, a towed vehicle, a fifth-wheel-type hitch for coupling said towed vehicle to said towing vehicle, and a device for restraining and capturing a towed vehicle-associated component of said fifth-wheel-type hitch in the event that said towed vehicle-associated component comes free of that part of said hitch associated with the towing vehicle;
   a. said hitch also having:
      (i) brackets at the first and second sides of the towing vehicle bed,
      (ii) said towing vehicle-associated hitch component being supported from said brackets and being engageable by said towed vehicle-associated hitch component; and
   b. said hitch restraining and capturing device comprising:
      (i) two transversely spaced apart, vertical supports,
      (ii) hitch component capturing and restraining means with first and second ends, a front edge, and a rear edge,
      (iii) means for securing the vertical supports of the hitch capturing and restraining device relative to the brackets of the fifth-wheel hitch as to position the hitch so capturing and restraining means in hitch component-intercepting and retaining relationship to the towing vehicle-associated components of the fifth-wheel hitch,
      (iv) an elongated member which extends transversely between said vertical supports and supports the rear edge of the hitch capturing and restraining means,
      (v) longitudinally extending arms at the ends of the transversely extending, elongated member,
      (vi) means fixing one end of each said arm to that one of the vertical supports on the same side of the towing vehicle bed, and
      (vii) means for fixing the opposite end of each said arm to the hitch component-supporting bracket on the same side of the towing vehicle bed.

8. A combination as defined in claim 7 wherein the means fixing said arms to said brackets and to said vertical supports provide pivotal connections between said arms and said vertical supports and between said arms and said brackets.

9. A combination as defined in claim 7 wherein said hitch component-capturing and restraining means comprises a horizontally oriented plate with first and second laterally spaced ends and transversely extending edges and a second, elongated member, said second member extending between and being fixed to the vertical supports of the device and having an integral portion on which one transversely extending edge of said plate is seated.

10. A combination as defined in claim 9 wherein said second elongated member has an integral portion extending to a level above that of the plate and wherein said hitch component-capturing and restraining means also includes longitudinally extending members at the ends of and fixed to said plate and extending to a level above that of the plate, said second elongated member and said longitudinally extending members thereby cooperating to keep a towed vehicle-associated hitch component intercepted by said plate from sliding off the plate.

11. A device for restraining and capturing a towed vehicle-associated component of a fifth-wheel-type hitch in the event that said towed vehicle-associated component comes free of that part of said fifth-wheel hitch which is mounted in a bed of a towing vehicle, said device comprising: hitch capturing and restraining means with a component which has a front edge, first and second laterally spaced ends, and a rear edge and is adapted to extend transversely and in a generally horizontal orientation across the towing vehicle bed, vertical supports at first and second laterally spaced ends of the bed, and an elongated member fixed to said vertical supports at the rear edge of the horizontally extending component, the elongated member having an upper part for trapping a towed vehicle-associated hitch component which has come free on said horizontally oriented component and a lower part to which the rear edge of said horizontally oriented component is attached.

12. The combination of a towing vehicle having a bed, a towed vehicle, a fifth-wheel-type hitch for coupling said towed vehicle to said towing vehicle, and a device for restraining and capturing a towed vehicle-associated component of said fifth-wheel-type hitch in the event that said towed vehicle-associated component comes free of that part of said hitch associated with the towing vehicle;

a. said hitch also having:
  (i) means providing brackets at the sides of the towing vehicle bed,
  (ii) said towing vehicle-associated hitch component being supported from said brackets and being engageable by said towed vehicle-associated hitch component; and
 b. said hitch restraining and capturing device comprising:
  (i) two transversely spaced apart, vertical supports,
  (ii) hitch component capturing and restraining means supported between and from said vertical supports, said hitch component capturing and restraining means comprising a horizontally oriented component with front and rear edges and laterally spaced ends and means at said ends and the rear edge of the horizontally oriented component for trapping thereon a trailer-associated hitch component which has fallen onto the horizontally oriented component,
  (iii) means for mounting the vertical supports and the restraining means in the bed of the towing vehicle and adjacent the towing vehicle-associated component of said hitch so that the towed vehicle-associated component of said hitch will be intercepted by said restraining means if it comes free from the bed-mounted component of the hitch.
  (iv) longitudinally extending arms at opposite ends of the transversely extending member,
  (v) means fixing one end of each said arm to that one of the vertical supports on the same side of the towing vehicle bed, and
  (vi) means for fixing the other end of each said arm to the bracket providing means on the same side of the towing vehicle bed.

* * * * *